United States Patent [19]
Rydberg et al.

[11] Patent Number: 5,497,503
[45] Date of Patent: Mar. 5, 1996

[54] METHOD FOR ASSIGNING FREQUENCY CHANNELS IN A CELLULAR COMMUNICATION SYSTEM AND FOR IDENTIFYING CRITICAL EXISTING FIXED MICROWAVE RECEIVERS THAT RESTRICT OPERATION OF SUCH A SYSTEM

[75] Inventors: James T. Rydberg, Hoffman Estates; Kenneth B. Hallman, Arlington Hts., both of Ill.

[73] Assignee: Ameritech Corporation, Hoffman Estates, Ill.

[21] Appl. No.: 69,128

[22] Filed: May 28, 1993

[51] Int. Cl.$^6$ ............................................... H04B 7/00
[52] U.S. Cl. ..................... 455/33.1; 455/56.1; 455/62; 455/63; 455/67.3; 379/59
[58] Field of Search ................................ 455/33.1, 33.2, 455/33.4, 34.1, 34.2, 56.1, 62, 63, 67.1, 67.3, 67.6; 379/59, 60

[56] References Cited

U.S. PATENT DOCUMENTS

| | | |
|---|---|---|
| 4,659,878 | 4/1987 | Dinkins . |
| 4,736,453 | 4/1988 | Schloemer . |
| 4,914,651 | 4/1990 | Lusignan . |
| 4,965,850 | 10/1990 | Schloemer . |
| 5,109,529 | 4/1992 | Akaiwa . |
| 5,134,709 | 7/1992 | Bi et al. ................................ 455/33.1 |
| 5,263,176 | 11/1993 | Kojima et al. ......................... 455/34.1 |

OTHER PUBLICATIONS

"Annex H—PCS/OFS Microwave Spectrum Sharing Coordination", Contribution in TIA TR14.11; Mar. 18, 1993.
"Telocator Spectrum Sharing Report"—An Overview of Spectrum Sharing Technologies for the Emerging Technologies Band; Version 2; Prepared by Telocator Technical 7 Engineering Committee; Jan. 20, 1993.
"Third Progress Report, Experimental Personal Communication Services", Ameritech Direct Communications (Nov. 22, 1991).
"Ameritech's Request for a PCS Pioneer's Reference", May 4, 1992.
"Fast Concept Accepted by Patent Office", PCS News, Sep. 3, 1992, p. 6.

*Primary Examiner*—Reinhard J. Eisenzopf
*Assistant Examiner*—Thanh Le
*Attorney, Agent, or Firm*—Willian Brinks Hofer Gilson & Lione

[57] ABSTRACT

A method for assigning frequency channels to base stations in a cellular communication system that coexists with a set of existing fixed site microwave receivers groups the base stations into clusters and the potential frequency channels into channel blocks. Each cluster is then assigned a usage parameter indicative of how many base stations within the cluster may operate within a given channel block. A computer model is operated to predict whether aggregate interference from the base stations and the associated handsets at the existing fixed site receivers would be excessive. If so, the usage parameters are revised to reduce the number of base stations within the respective cluster that may operate within an interfering channel block. These steps are repeated until the aggregate interference from the base stations and associated handsets at the existing fixed site microwave receivers is no longer excessive. Frequency channels are then assigned to the base stations in accordance with the usage parameters as determined above. The computer model is also used to predict an exclusion zone for each of the existing fixed site microwave receivers, each exclusion zone identifying an area within which interference from at least one of the base stations and associated handsets is excessive.

5 Claims, 2 Drawing Sheets

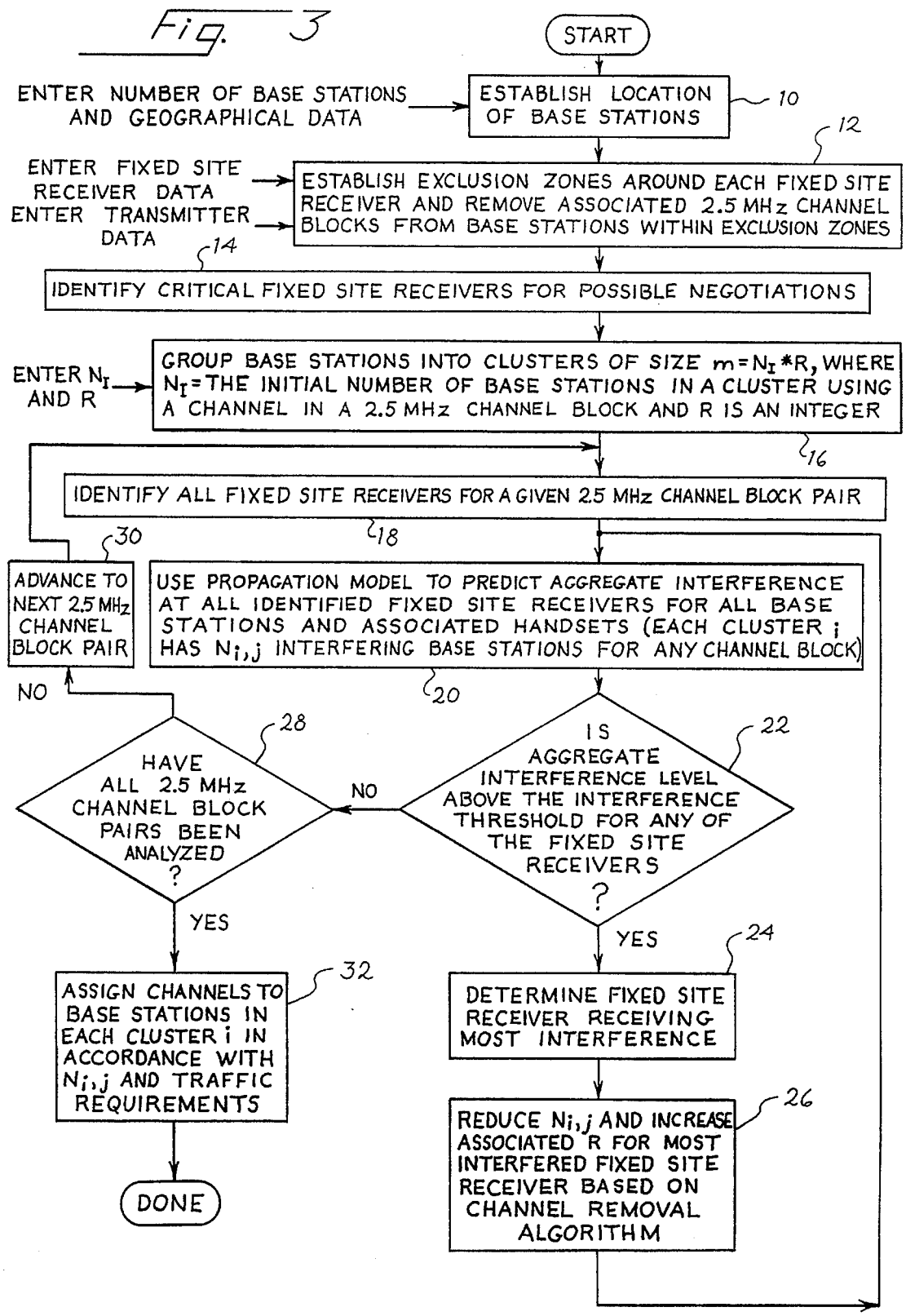

METHOD FOR ASSIGNING FREQUENCY CHANNELS IN A CELLULAR COMMUNICATION SYSTEM AND FOR IDENTIFYING CRITICAL EXISTING FIXED MICROWAVE RECEIVERS THAT RESTRICT OPERATION OF SUCH A SYSTEM

BACKGROUND OF THE INVENTION

This invention relates to a planning tool that assists in assigning frequencies to base stations of a cellular communication system and in identifying critical fixed site receivers that coexist with such a system, and to methods for operating such a planning tool.

In certain circumstances cellular communication systems are required to operate in the same portion on the radio frequency spectrum as other users. This is true for example with personal communication systems (PCS's) that under FCC proposed regulations are required to share the radio spectrum with pre-existing fixed site microwave users. In such situations, the fixed site microwave users in a given geographical area have not completely occupied all available channels within the portion of the radio frequency spectrum available for use, and the cellular system can use this extra capacity without adversely affecting the pre-existing fixed site users.

In many cases, the number, location and operating characteristics of the fixed site users will vary over time, and it may be possible to relocate many of the pre-existing fixed site users out of the spectral region of interest to the cellular system. Thus, the need for spectrum sharing is expected in many cases to fall over time. However, during the period when spectrum sharing is required, the question remains of how best to structure a cellular system to co-exist with pre-existing fixed site users.

The report entitled "Telocator Spectrum Sharing Report: An Overview of Spectrum Sharing Technologies for the Emerging Technologies Band" (Version 2, Telocator Technical and Engineering Committee, Jan. 20, 1993) summarizes seven alternative approaches to the spectrum sharing problem. All of these approaches are directed to cellular systems of the type having multiple base stations which send radio signals to mobile handsets and receive radio transmissions therefrom. Six of the approaches summarized in this report require either the base stations or the handsets to measure microwave interference levels, and then use the measured microwave interference levels in selecting the frequency channels used for communication between the base stations and the mobile handsets.

Such a measurement-based approach brings with it several important disadvantages. First, the base stations, the handsets or both must be capable of measuring microwave interference levels prior to transmitting on a particular channel. This complicates the function and structure of the base stations or handsets, and thereby increases expense. Furthermore, measurement-based approaches which rely on real time measurements of interference levels may require channel reallocation during a radio transmission, if a mobile user's interference to a fixed microwave site increases due to a change in position.

One of the six measurement based approaches described in the above-identified report is identified as the American Personal Communications Frequency Agile Sharing Technology (FAST). This approach utilizes a computer model to predict interference of base stations and handsets with pre-existing fixed site microwave users. This computer model requires measurements to be taken by the base stations and by mobile units to improve the accuracy and to confirm the reliability of the computer simulation. This approach utilizes some of the advantages of a computer modeling system, yet it retains the cost and complexity of a measurement-based system.

The only one of the seven approaches described in the above-identified report that does not require either the base station or the handset to measure interference from fixed site users is the Ameritech Frequency Avoidance by Zone Exclusion (FAZE) system. That system embodies the present invention, and it is described in detail below.

SUMMARY OF THE INVENTION

According to this invention, a method is provided for assigning frequency channels to base stations in a cellular communication system that co-exists with fixed site receivers. According to this method, the base stations are grouped into clusters and the potential frequency channels are grouped into channel blocks. A usage parameter is assigned to each cluster indicative of how many base stations within the respective cluster may operate within a given channel block. A computer model is then operated to predict whether aggregate interference from the base stations and associated handsets at the fixed site receivers will be excessive. If so, the usage parameters for at least some of the clusters are revised to reduce the number of base stations within the respective cluster that may operate within an interfering channel block. The modeling and revising steps are repeated until the predicted aggregate interference from the base stations at the fixed site receivers is no longer excessive. Potential channels are then assigned to the base stations in accordance with the usage parameters as determined above. Preferably, the computer model is provided with information regarding antenna height for at least some of the associated handsets, and this antenna height information is used in the computer model in predicting whether aggregate interference from the base stations and associated handsets will be excessive.

According to another aspect of this invention, a method is provided for identifying critical fixed site receivers that restrict operation of the cellular communication system. According to this method, a computer model is provided to predict propagation losses for radio transmissions. The computer model is supplied with receiver data that define the location, reception frequency, and acceptable interference level for each of the fixed site receivers. The computer model is also supplied with transmitter data that define transmitted radio power for at least one of the base stations and associated handsets at a frequency received by at least some of the fixed site receivers. The computer model is then used to predict an exclusion zone for each of the fixed site receivers, each exclusion zone identifying an area within which interference from either the base station or the associated handset is excessive. The exclusion zones are then identified to a user to allow the user to select the fixed site receivers that most restrict operation of the cellular communication system.

BRIEF DESCRIPTION OF THE DRAWINGS

FIG. 3 is a flow chart for the preferred embodiment of the planning tool of this invention.

DETAILED DESCRIPTION OF THE PRESENTLY PREFERRED EMBODIMENTS

Figure 1:
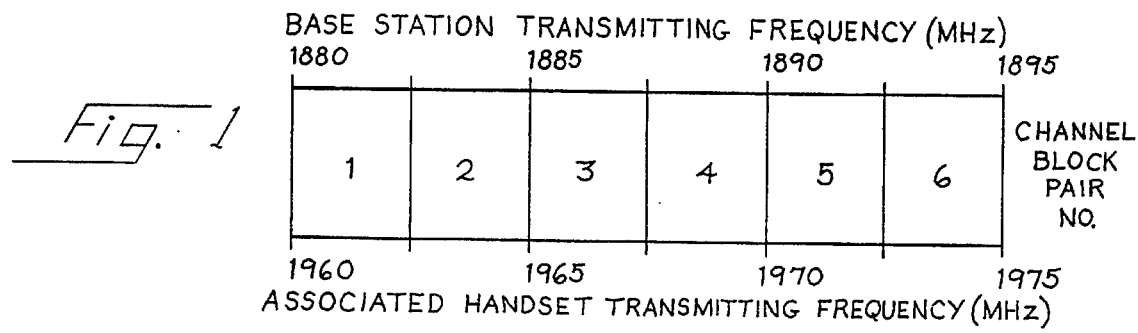
FIG. 1 is a schematic representation of a portion of a radio frequency spectrum and associated channel block pairs.

The following discussion relates to a preferred embodiment of the planning tool and method of this invention. This planning tool can be used in a cost effective method for ensuring co-existence between a new cellular system and pre-existing fixed site microwave users, without adding additional complexity and cost to either the base stations or the handsets. The following description provides one specific example in the context of a Personal Communication System (PCS). However, this invention is not limited to use with such a system, and it can readily be adapted to other types of cellular systems operating at other portions of the radio frequency spectrum. In the following discussion, the term "handset" is intended broadly to include voice handsets as well as wireless terminals which transmit and receive digital data, whether hand held or not.

One important function of the planning tool described below is to define exclusion areas around fixed site microwave receivers, in which areas particular frequencies are prohibited to the cellular system. This information is used to determine which pre-existing fixed site microwave receivers should be targeted for negotiations with a view to relocating the sites to other facilities or frequency bands. In addition, the planning tool described below assists in assigning frequencies to individual base stations such that the composite signal strength of the cellular system at any pre-existing fixed site microwave receiver is within established interference criteria. In this way, the planning tool allows channels to be assigned to base stations so that neither the base stations nor the associated handsets cause interference to fixed site microwave users.

Several assumptions were made during the development of the planning tool described below, including the following:

1. The base stations of the cellular system control the frequencies at which the handsets radiate power, and the base stations are adapted to receive a set of assigned channels and to operate only on one of the assigned channels;

2. For time division multiple access systems only a single handset must be considered for each base station, since multiple handsets on the same channel only increase the time duration of interference. For code division multiple access systems the number of simultaneous users operating on a channel alters the total power of the channel and therefore should be considered;

3. The planning tool is intended to aid in system level interference problems with fixed site receivers, and does not address interference between individual base stations;

4. The planning tool does not address the problem of interference to a cellular system resulting from radiated power of existing fixed site microwave users, though such power will be important in determining the effective radius of individual base stations.

Although the planning tool described below has been designed for use with low power cellular systems such as personal communication systems, it can be readily adapted for use with higher power cellular systems. In this case, the cluster size described below is often best set equal to one.

To simplify the model and reduce the number of required calculations, the planning tool described below is based on interference modeling and frequency assignments for blocks of frequency channels, each block having a width of 2.5 MHz. 2.5 MHz was chosen as the width of the frequency blocks because this is the smallest frequency block within the FCC proposed frequency assignments for PCS that can affect different existing fixed site microwave receivers. These fixed site microwave receivers each have a bandwidth of either 5 or 10 MHz, and the center frequencies for differing users differ by 5 MHz. Of course, when the planning tool is adapted for use in other systems, the width of the channel blocks can be varied as appropriate.

Figure 2:
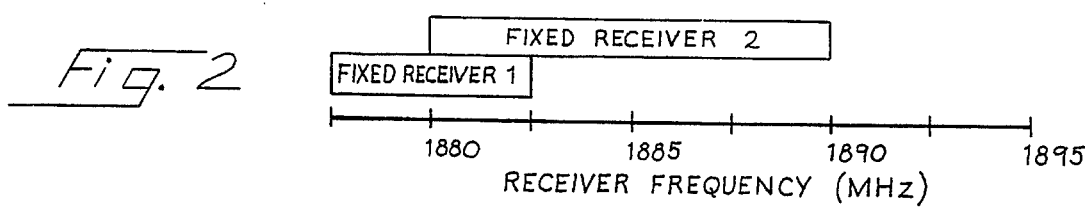
FIG. 2 is a schematic representation of the spectral regions in which two fixed site microwave receivers operate.

FIGS. 1 and 2 provide further information about a specific example used in the following detailed description of the planning tool. As shown in FIG. 1, this embodiment has been adapted for use with a personal communication system in which the base stations transmit on frequency channels located between 1880 and 1995 MHz, and the handsets transmit on associated frequency channels between 1960 and 1975 MHz. Base station channels are allocated to handset channels as shown in FIG. 1, in which all available channels have been classified into one of six channel blocks numbered 1–6. Thus, channel block 3 includes all base station frequency channels between 1885 and 1887.5 MHz along with all handset frequency channels between 1965 and 1967.5 MHz.

The following example is highly simplified, but it illustrates the operation of this preferred embodiment. In this example there are two fixed site microwave receivers. Fixed site receiver 1 operates with a bandwidth of 5 MHz centered on 1880 MHz, and fixed site receiver 2 operates with a bandwidth of 10 MHz centered on 1885 MHz.

FIG. 3 provides a flow chart that illustrates the operation of the preferred embodiment of the planning tool of this invention. This planning tool can be implemented as a programmed computer, such as a personal computer or a workstation.

As shown in FIG. 3, the first step in the execution of this planning tool is to establish the location of the base stations in block 10. The user enters the total number of base stations to be included in the cellular system and geographical data for the area to be covered by the cellular system. The planning tool utilizes this information in block 10 to place base stations uniformly throughout the coverage area. The geographical data supply terrain and topographic information to the planning tool, which uses this information to make coarse decisions as to where base stations should be located. For example, the geographical data allow the planning tool not to put a base station in the middle of a lake.

In block 12 the planning tool automatically establishes exclusion zones around fixed site microwave receivers in the area of interest. As explained above, the planning tool assists in designing a cellular system in such a way that the frequency spectrum is shared between such fixed site microwave users and the cellular system without creating unacceptable levels of interference for the fixed site users.

The exclusion zone for each of the fixed site receivers is based on the interference generated by a single radiating handset or a single radiating base station operating at the frequency of the fixed site microwave receiver. The exclusion zones are calculated using appropriate interference criteria and propagation models. These models and criteria should conform to the recommendations made in Bulletin 10 of TIA Committee TR14.11.

In block 12 the planning tool starts with radiated power at the base station or handset, calculates predicted propagation losses between the base station or handset and the fixed site receiver, and then compares the resulting interference at the fixed site receiver against preselected criteria. In this way exclusion zones are established around each fixed site receiver, within which all base station and handset transmissions are precluded (within the associated 2.5 MHz channel block). Once exclusion zones are calculated for each fixed site receiver, critical fixed site receivers are identified in block 14 for possible negotiations.

In calculating exclusion zones, different interference criteria may be used dependent upon the type and application of the fixed site receiver. These criteria should conform to recommendations made in Bulletin 10 of TIA Committee TR14.11.

One criterion for maximum allowable interference may be a fixed level of signal strength resulting from base station and handset radiated power. For example, if the maximum interference level allowed were −106 dBm, the cellular system would not degrade the fixed receiver noise floor by more than 1 dB. Another possible maximum interference criterion may be based on a minimum required availability of the fixed receiver, such as for example greater than 99.999%.

When using availability as an interference criterion for analog fixed site receivers, the maximum interference level can be calculated as follows:

Maximum Interference Level=Rx Level−RF C/I−Fade Margin, where RF C/I is the level which degrades base band sensitivity below 30 dB when the fixed site receiver is in a faded state and Fade Margin is determined from the availability requirement. The maximum acceptable interference level from the cellular system is then used in conjunction with a propagation model to establish minimum acceptable separations of the base stations and the handsets of the cellular system from the fixed site receivers at the interfering channel blocks.

In order to use a propagation model effectively, it is important that the planning tool be supplied both with data defining the characteristics of the fixed site receivers, and data defining the radiated power transmitted by the base stations and the handsets. Typically, the fixed site receiver data will include the location of the fixed site receivers, antenna height, antenna gain, pattern and polarization, the effective isotropic radiated power (EIRP) of the associated fixed site transmitter, the acceptable interference level (which may be expressed in terms of the minimum availability requirement), the frequency, the bandwidth, and cable losses. The transmitter data for the base station and handsets will preferably include the EIRP in the bandwidth of the fixed site receiver and the antenna height.

Through propagation testing, it has been found that the Hata propagation model applies well for PCS base stations and handsets on the street as discussed in M. Hata, "Empirical Formula for Propagating Loss in Land Mobile Radio Services" IEEE Trans. VTS, Vol. 29, No. 3, pp. 317–325, August 1980.

In this model the urban propagation loss Lp is determined as follows:

$$Lp=69.55+26.16\log(f)-13.82\log(h_{mw})+[44.9-6.55\log(h_{mw})]\log(d)-a(h_{pcs}),$$

where $a(h_{pcs})=[1.1\log(f)-0.7]h_{pcs}-[1.56\log(f)-0.8]$, f=Frequency (MHz), $h_{pcs}$=PCS antenna height in meters, $h_{mw}$=Fixed site microwave receiver antenna height in meters, d=Distance in kilometers between PCS and fixed site microwave receiver.

In suburban areas the following suburban correction is used to determine the suburban propagation loss $L_{ps}$:

$$L_{ps}=L_p-2[\log(f/28)]^2-5.4.$$

The planning tool identifies in block 14 the critical fixed site receivers for possible negotiations. This can be done, for example, by graphically displaying base station and handset exclusion zones, or by listing the areas of the exclusion zones. In order to achieve minimum exclusion zones, zones are predicted based on a single base station transmitter and a single radiating handset. For frequency division duplexed systems, composite exclusion zones are constructed that account for individual base station and associated handset exclusion zones.

Successful deployment of a PCS system is contingent upon the ability of the PCS system to coexist with existing fixed site microwave receivers. Successful coexistence may rely heavily upon the ability of the PCS operator and the fixed site microwave user to engage in negotiations with benefits resulting for both parties. Areas for negotiation include the following: relocation of a fixed site microwave receiver to a different frequency band, establishment of higher acceptable interference levels, optimization of microwave links, and possible utilization of a portion of the licensed bandwidth of a fixed site microwave receiver by the PCS system. The need for such negotiations will be dependent upon the extent to which a particular fixed site receiver adversely affects the desired PCS coverage area.

The planning tool will highlight in block 14 fixed site receivers that create exclusion zones which prevent PCS service. This may occur if as few as two different 10 MHz fixed site receivers are located on the same tower. If the PCS operator desires service in this area, negotiations to relocate one or both of these fixed site receivers will be necessary. In addition, the PCS operator may choose to begin negotiations for long term relocation of many or even all of the fixed site receivers that adversely affect PCS coverage.

Even if relocation is unnecessary or not desired, negotiations are often advisable with users of fixed site receivers to understand individual requirements for receiver availability and fade margins. In some cases, it may be preferable to test and optimize a fixed site receiver so that confidence in the fade margin can be obtained. In addition, such optimization may provide improvements in fade margin which may reduce exclusion zones by increasing the level of allowable PCS signal strength. Inquiries may also be useful to determine if any of the licensed spectrum for a fixed site user is unused. Such unused spectrum is most often associated with analog fixed site receivers which are not loaded to capacity. Through negotiations, agreements can on occasion be made which allow PCS operation within selected portions of the licensed spectrum to increase avoidance capabilities.

As shown in FIG. 3, the next step in block 16 is to group the base stations into clusters of size M, where M is an integer equal to $N_I*R_2$. In this equation $N_I$ is equal to the initial number of base stations in a cluster using the same frequency channel within a given 2.5 MHz channel block, and R is a positive integer indicative of the number of base stations within a grouping in which the same frequency channel cannot be used. A cluster of base stations can be considered to be a point source for propagation calculations as long as the distance between the cluster and the fixed site receiver is much greater than the geographic size of the cluster. For this reason, for high tier cellular services where the cell radius in on the order of miles, it may be most effective to use a cluster size of 1, i.e. $N_f=R=1$.

Figure 4:
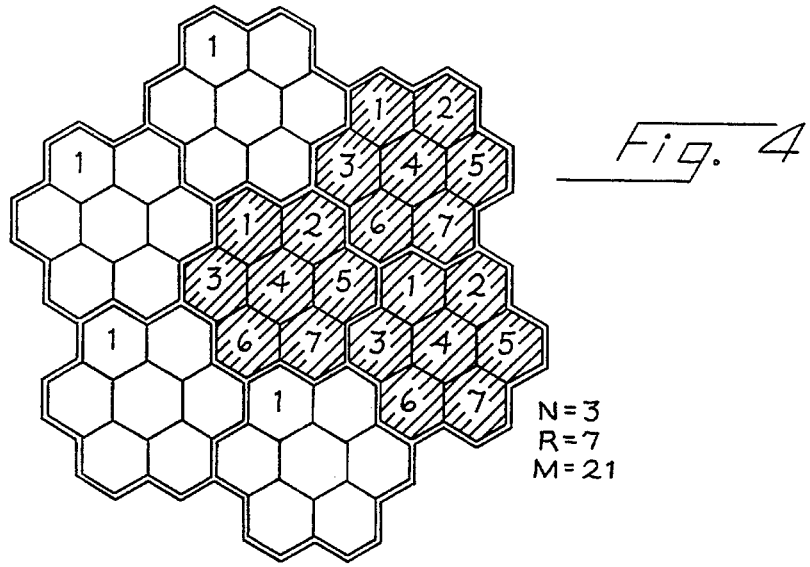
FIG. 4 is a schematic diagram of some of the base stations of a cellular communication system, including a cluster of 21 base stations.

FIG. 4 shows one example of the manner in which base stations can be grouped into a cluster. In FIG. 4 each base station is shown as a respective hexagon, and the shaded hexagons are combined into a single cluster. For this cluster $M=21$, $N_f=3$ and $R=7$. In effect, the cluster is divided into three groups, each group having seven base stations, and each base station within any given group operating at a separate channel. By setting $R=7$, adjacent base stations are prevented from operating in the same channel, thereby minimizing base station to base station interference. By setting $N_f=3$, it is assured that no more than 3 of the base stations in the entire cluster are operating at the same channel block at the same time.

The next step in the flow chart of FIG. 3 is the identification of all fixed site receivers for a given 2.5 MHz channel block pair within the coverage area. This is done in block 18.

In block 20, the effects of multiple base stations and multiple handsets are taken into account to determine composite or aggregate interference. The amount of the predicted aggregate interference will depend upon the propagation model used. Through propagation testing, it has been found that the Hata model described above applies well for PCS base stations. In addition, elevated handsets operating within a building are included in the computer model since a single elevated handset may result in a stronger cumulative effect than 20 base stations. Therefore, it is preferred that the propagation model used for handsets elevated in buildings include a gain factor for handset elevation. A typical gain factor for this purpose is described in Mobile Communications Design Fundamentals, W. C. Y. Lee, Section 11.2.1 (J. Wiley and Sons, 1993). Handset height information may be provided in the form of statistical distributions, averages, or worst case values.

According to Lee, elevated handsets inside a building have decreased signal strength of 15 dB due to building penetration loss but increased signal strength due to elevation. The rate of increase in gain from elevation is 2.75 dB per floor from the first to fifteenth floor and increases at a rate of 6 to 7 dB per octave above the fifteenth floor.

To account for elevated handsets a determination of the highest floor the handset will operate on is needed along with the number of handsets that could be operating simultaneously at this height. For example, a cluster is located in an urban environment with office buildings with a maximum of 15 stories and is estimated that no more than 10 handsets within this cluster will be operating simultaneously and at this height. To calculate the interference from these elevated handsets into a fixed site receiver, a suitable propagation model such as Hata should be used and modified with the appropriate gain factor:

Path loss from Hata+Building Penetration−GainFactor=Single Elevated Handset Path Loss For this example, the building penetration is 15 dB and the gain factor is 41.25 dB. To calculate total interference at the fixed site receiver, the path loss should be reduced by 10Log(# of simultaneous users). For this example the path loss would be reduced by 10 dB. While this is an appropriate example, an industry accepted methodology for incorporating handset elevations, such as one recommended by TIA TR14.11, would be preferred for some applications.

In a frequency division duplex system both the base stations and the handsets must be taken into account, because a base station and the associated handsets will create interference for different fixed site receivers. In a time division duplex system, only the worst case offender is required.

For accuracy in predicting interference levels at the fixed receivers, the following information for the base stations and associated handsets is preferably provided to the model:

Base Stations

Transceiver Locations

Transmit Bandwidth

Antenna Height

Antenna Gain, Pattern and Polarization

EIRP

Traffic Requirements

Cable Losses

Handsets

Areas in which handsets may be elevated

Antenna Height

EIRP

Composite interference from base stations is computed by computing the interference level for each cluster into each fixed site receiver which operates within a given 2.5 MHz band. Each cluster initially has $N_I$ interfering base stations, where $N_I$ is set equal to 3 in this example. By starting with a relatively large value for $N_I$ (and therefore a relatively small value for R), the planning tool finds the system solution allowing for maximum traffic potential. Composite interference is also computed for handsets. The planning tool is provided with information defining the number of handsets which can operate at the same frequency and time, and the number of handsets which are elevated. As explained above, elevated handsets have a potential for creating more interference for fixed site receivers as the handsets approach free space propagation.

After the aggregate interference has been predicted for all of the fixed site receivers in block 20, the planning tool then tests in block 22 to determine whether the aggregate interference level is above the maximum allowable interference threshold for any of the fixed site receivers. If any of the interference criteria are violated, control then branches to block 24, which determines the fixed site receiver with the maximum violation of the associated interference criteria. During interference calculations, the planning tool may have concluded that more than one fixed site receiver is receiving an excessive level of interference. For most efficient processing, the planning tool first addresses the fixed site receiver with the maximum interference. Once the interference problems associated with this fixed site receiver are resolved, the planning tool will then determine if other fixed site receivers are still receiving interference. If so, the planning tool will again address the most interfered fixed site receiver.

To reduce interference, the planning tool utilizes a channel removal algorithm in block 26 to determine on a channel block basis which clusters and which channel blocks should have reduced usage. This is done either by decreasing the usage parameter $N_{i,j}$ or increasing the associated parameter R for clusters which adversely affect the most interfered fixed site receiver. In this connection, the usage parameter $N_{i,j}$ indicates the parameter N for cluster i and frequency block j. $N_{i,j}$ starts equal to $N_f$, or 3 in the above example. When the planning tool discovers an interference problem (combined cluster interference level above the interference threshold of one or more fixed site receivers), the planning tool determines which clusters in which to decrease $N_{i,j}$. This operation is performed separately for each fixed site receiver, starting with the most interfered receiver. Of course, the parameter R varies inversely with $N_{i,j}$ and can therefore be considered a usage parameter as well.

The first step in the channel removal algorithm is to rank the clusters by the interference contribution they make at the 2.5 MHz channel block of interest. For each fixed site receiver which operates within a given 2.5 MHz channel block, clusters are ranked according to (1) the amount of interference they create for the fixed site receiver and (2) the relative importance the cluster has on supporting projected traffic. This ranking will provide a list of clusters which most affect total interference to the fixed site receiver. A cluster's contribution to total interference is calculated using the appropriate handset and propagation models, and this contribution is divided by the total interference received by the fixed site receiver. This result, which is a percent from 0 to 100, is combined with the relative importance a cluster has with respect to projected traffic. Clusters located in areas where projected traffic is high are more important and should not be targeted first for channel block reduction or elimination. In this example these clusters are given a traffic weighting of 1 on a scale of 1 to 10. Clusters where projected traffic is very light may be given a traffic weighting of 10 on this scale.

Figure 5:
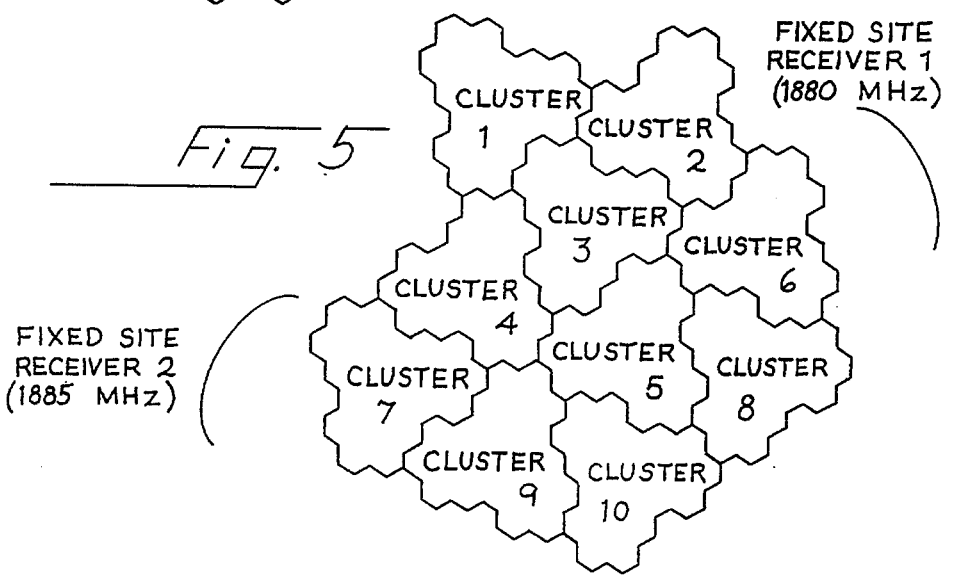
FIG. 5 is a schematic diagram of a cellular communication system including ten base station clusters.

Once the interference contributions and traffic weighting numbers are determined as described above, these two parameters are combined by multiplying them together to generate a ranking number between 1 and 10. Clusters are then ranked based on this ranking number as illustrated in the following example. This example is based on the arrangement shown in FIG. 5 in which fixed site receivers 1 and 2 operate in the frequency ranges shown in FIG. 2. Each of the clusters 1 through 10 has 21 cells or base stations as shown in FIG. 4.

In this example it has been determined that interference thresholds are exceeded for channel block 1 (see FIG. 1). More specifically, it has been determined that fixed site receiver 1 is the most interfered with fixed site receiver that utilizes channel block 1. Table 1 shows the interference weightings for fixed site receiver 1 (the percentage of total interference associated with each of the 10 clusters), traffic weighting (between 1 and 10) resulting ranking number (equal to the interference weighting multiplied by the traffic weighting), and resulting cluster rank for the 10 clusters.

TABLE 1

| Cluster | Interference Weighting | Traffic Weighting | Ranking Number | Final Rank |
|---|---|---|---|---|
| Cluster 1 | 2.5% | 5 | .125 | 5 |
| Cluster 2 | 1.5% | 8 | .12 | 7 |
| Cluster 3 | 10% | 4 | .40 | 3 |
| Cluster 4 | 3% | 4 | .12 | 6 |
| Cluster 5 | 5% | 2 | .10 | 8 |
| Cluster 6 | 45% | 1 | .45 | 2 |
| Cluster 7 | 2% | 9 | .18 | 4 |
| Cluster 8 | 29.5% | 5 | 1.475 | 1 |
| Cluster 9 | 1% | 7 | .07 | 9 |
| Cluster 10 | .5% | 3 | .015 | 10 |

Table 1 shows that even though Cluster 6 creates the most interference for fixed site receiver 1, Cluster 6 is critical with respect to traffic considerations, and it therefore has a final rank of 2.

The channel removal algorithm takes the final rank into account and changes the usage factor $N_{i,j}$ as necessary to reduce the total interference generated by the cellular system for fixed site receiver 1 below the threshold value. This is done by incrementally reducing the value $N_{i,j}$ for the highest ranking cluster i and the appropriate channel block j and rechecking the resulting cumulative or aggregate interference to the fixed site receiver 1. If after reducing $N_{i,j}$ for the highest ranking cluster to zero (thereby eliminating usage of the channel block j), the cluster removal algorithm continues if necessary by reducing the value of $N_{i,j}$ for the next most highly ranked cluster.

Continuing with the example started above, the channel removal algorithm determines that $N_{8,1}$ must be set equal to zero and that $N_{6,1}$ must be set equal to 1 to decrease interference to the fixed site receiver 1 to an acceptable level. The remaining clusters can operate in channel block 1 without a reduction in $N_{i,1}$ for these clusters. With the first fixed site receiver addressed, the planning tool recalculates composite interference and determines if any other fixed site receiver has exceeded its interference threshold. If so, the planning tool returns to the channel removal algorithm and determines the appropriate action to take to resolve this interference.

Once the planning tool reduces interference for all fixed site receivers in a given channel block j, the planning tool then determines in block 28 whether all 2.5 MHz channel block pairs have been analyzed. If additional channel block pairs require analysis the planning tool advances to the next 2.5 MHz channel block pair and returns control to block 18.

Once all 2.5 MHz channel blocks have been analyzed, control is passed to block 32. At this point, after all channel block pairs have been addressed and all interference thresholds have been satisfied, the clusters each have a maximum set of channel blocks and maximum values $N_{i,j}$ associated with them. This is best illustrated through continuing the example started above. Analysis of fixed site receiver 2 with respect to channel block 1 indicates that channel block 1 must be eliminated from clusters 7 and 9 and that $N_{10,1}$ must be reduced to 2. The planning tool continues with channel block 2 and determines that only fixed site receiver 2 operates in this band. To reduce interference to fixed site receiver 2, channel block is eliminated from clusters 7 and 9 and $N_{10,2}$ is decreased to 2. Channel blocks 3 and 4 give similar results, and channel blocks 5 and 6 have no fixed site receivers operating at those frequencies. The final result is summarized in Table 2, which shows $N_{i,j}$ for all of the clusters 1 through 10.

TABLE 2

| $N_{i,j}$ | Final Values for $N_{i,j}$ | | | | | |
|---|---|---|---|---|---|---|
| | j = 1 | 2 | 3 | 4 | 5 | 6 |
| i = 1 | 3 | 3 | 3 | 3 | 3 | 3 |
| 2 | 3 | 3 | 3 | 3 | 3 | 3 |
| 3 | 3 | 3 | 3 | 3 | 3 | 3 |
| 4 | 3 | 3 | 3 | 3 | 3 | 3 |
| 5 | 3 | 3 | 3 | 3 | 3 | 3 |
| 6 | 1 | 3 | 3 | 3 | 3 | 3 |
| 7 | 0 | 0 | 0 | 0 | 3 | 3 |
| 8 | 0 | 3 | 3 | 3 | 3 | 3 |
| 9 | 0 | 0 | 0 | 0 | 3 | 3 |
| 10 | 2 | 2 | 2 | 2 | 3 | 3 |

Returning to FIG. 3, channels are assigned in block 32 to base stations in each cluster i in accordance with $N_{i,j}$ and traffic requirements. Predicted or actual traffic information is applied as an input to block 32, and these traffic requirements determine the total number of channels required for each base station. These channels are selected by examining channels in the channel blocks available at each base station, and assigning the appropriate number of channels. At this stage it may be recognized that there are base stations where there are not enough channels available to support the predicted or actual traffic. If this occurs, the user may readdress the list of critical fixed site receivers (block 14) to determine if additional fixed site receivers require relocation. If negotiations are unsuccessful, the operator may be unable to support all desired PCS traffic.

The planning tool described above can be used both in initial configuration of a cellular system and in ongoing system planning. Mobil systems such as PCS require constant system planning as traffic requirements, coverage requirements, and spectrum availability change. Traffic requirements change as new subscribers are added and as existing users change their usage habits. Spectrum availability changes as fixed site receivers are relocated to other frequency bands or facilities, or as existing fixed site receivers expand within the frequency range of interest. The planning tool described above is well suited to deal with these changes.

Whenever traffic requirements or spectrum availability changes, the planning tool can be re-executed. However, since the planning tool has already calculated the frequency channels available to a base station, the user often needs to enter only the new traffic requirements. The planning tool will reassign channel blocks to base stations to account for new requirements. On the other hand, if fixed site receivers are added or deleted, the microwave database should be revised and the entire planning tool reexecuted. Similarly, if additional base stations or geographic coverage areas are required, the updated information should be provided to the planning tool and the planning tool should be reexecuted.

From the foregoing, it should be apparent that a cost effective planning tool has been described, which allows a cellular system to share spectrum with fixed site receivers. This system is effective in both urban and rural settings.

The planning tool can be used with cellular systems that utilize relatively simple hardware, because there are no interference measurement functions required of the base stations or the handsets for base station channel assignment. The planning tool is versatile in that it can be used with time division, frequency division, and code division multiple access systems at any portion of the radio frequency spectrum. The planning tool is cost effective in that it can be programmed to run on commonly available personal computers or work stations. It allows fast response and, because it utilizes handset elevation in determining projected interference, provides an acceptable level of accuracy. As described above, this tool is versatile, and it can be reexecuted whenever traffic or fixed site receiver locations change. Because the planning tool identifies critical fixed site receivers that create coverage problems for the system, it assists the user in negotiating solutions to such problems.

Of course, it should be recognized that a wide range of changes and modifications can be made to the preferred embodiments described above. It is therefore intended that the foregoing detailed description be regarded as illustrative rather than limiting, and that it be understood that it is the following claims, including all equivalents, that define the scope of this invention.

We claim:

1. A method for assigning frequency channels to a plurality of base stations in a cellular communication system that coexists with a set of pre-existing fixed site receivers, separate from the cellular communication system, said method comprising the following steps:

a) grouping the base stations into a plurality of clusters, each cluster comprising a set of base stations;

b) grouping a plurality of potential frequency channels into a plurality of channel blocks;

c) assigning a usage parameter to each cluster indicative of how many base stations within the respective cluster are operable within a given channel block;

d) operating a computer model to predict whether aggregate interference from the base stations and associated handsets at the pre-existing fixed site receivers would be excessive;

e) revising the usage parameters for at least some of the clusters to reduce the number of base stations within the respective cluster that are operable within an interfering channel block;

f) repeating steps d) and e) until the predicted aggregate interference from the base stations and associated handsets at the pre-existing fixed site receivers is no longer excessive; and then g) assigning potential frequency channels to the base stations in accordance with the usage parameters as determined in step e).

2. The method of claim 1 wherein step d) comprises the steps of d1) providing the computer model with information regarding antenna height for at least some of the associated handsets;

d2) using the antenna height information in the computer model in predicting whether aggregate interference from the base stations and associated handsets at the existing fixed site receivers will be excessive.

3. The method of claim 1 wherein each of the potential frequency channels is included in only a respective one of the channel blocks in step (b).

4. The method of claim 1 wherein a first one of the channel blocks includes at least one potential frequency channel that is not included in a second one of the channel blocks.

5. The method of claim 1 wherein at least some of the clusters of base stations comprise more than one base station.

* * * * *

UNITED STATES PATENT AND TRADEMARK OFFICE
CERTIFICATE OF CORRECTION

PATENT NO. : 5,497,503
DATED : March 5, 1996
INVENTOR(S) : James T. Rydberg et al.

It is certified that error appears in the above-indentified patent and that said Letters Patent is hereby corrected as shown below:

```
In column 6, line 2, delete "=" and substitute --≡--.
In column 6, line 3, delete "=" and substitute --≡--.
In column 6, line 4, delete "=" and substitute --≡--.
In column 6, line 5, delete "=" and substitute --≡--.
In column 6, line 7, delete "=" and substitute --≡--.
In column 10, line 45, after "block" insert --2--.
```

Signed and Sealed this

Fifteenth Day of October, 1996

Attest:

BRUCE LEHMAN

*Attesting Officer*     *Commissioner of Patents and Trademarks*